US006363480B1

(12) United States Patent
Perlman

(10) Patent No.: US 6,363,480 B1
(45) Date of Patent: Mar. 26, 2002

(54) EPHEMERAL DECRYPTABILITY

(75) Inventor: Radia J. Perlman, Acton, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/395,581

(22) Filed: Sep. 14, 1999

(51) Int. Cl.$^7$ .............................................. G06F 11/30
(52) U.S. Cl. ....................... 713/164; 713/165; 713/166
(58) Field of Search ................................ 713/164, 165, 713/166, 168, 200, 201

(56) References Cited

U.S. PATENT DOCUMENTS 6,055,314 A * 4/2000 Spies et al. .................... 380/21

OTHER PUBLICATIONS

Schneier, "Applied Cryptography", 1995, general.*
Menezes, "Handbook of Applied Cryptography", 1996, sec. 13.7.2, 13.2.1*
http://www.nwfusion.com/archive/1999b/0830netbuzz.html "E-mail that disappears" 4 pages.
http://home.netscape.com/eng/ss13/draft302.t "Transport Layer Security Working Group" 58 pages.
Schneier, Bruce "Applied Cryptography Second Edition: protocols, algorithms, and source code in C" 1996 5 pages.
http://www.anl.gov/ECT/certify/CA-Overview.html "An Introduction to Certification Authorities and Public Key Cryptography" 4 pages.
http://www.tda.ecrc.ctc.com/kbase/doc/brief/digsig.html "Digital Signatures and Certification Authorities" 3 pages.
http://www.smartcardforum.org/news/whatis.html "What is a Smart Card?" 2 pages.

* cited by examiner

Primary Examiner—Thomas R. Peeso
(74) Attorney, Agent, or Firm—Weingarten, Schurgin, Gagnebin & Lebovici LLP

(57) ABSTRACT

A system and method for a user to encrypt data in a way that ensures the data cannot be decrypted after a finite period. A number of ephemeral encryption keys are established by a first party, each of which will be destroyed at an associated time in the future (the "expiration time"). A second party selects or requests one of the ephemeral encryption keys for encrypting a message. The first party provides an ephemeral encryption key to the second party. Subsequently, the first party decrypts at least a portion of the message, using an ephemeral decryption key associated with the ephemeral encryption key provided to the second party. At the expiration time, the first party destroys all copies of at least the ephemeral decryption key, thus rendering any messages encrypted using the ephemeral encryption key permanently undecipherable. In an alternative embodiment, a number of ephemeral key servers provide a respective number of ephemeral encryption keys having associated expiration times. A party wishing to transmit an ephemeral message uses the provided ephemeral encryption keys to encrypt at least a portion of the message. The receiver of the message uses at least a subset of the ephemeral key servers to decrypt at least a portion of the encrypted message. At the expiration time(s), at least one of the ephemeral key servers permanently destroys at least one of the decryption keys associated with the provided ephemeral encryption keys.

66 Claims, 6 Drawing Sheets

| | 14 | 16 | 18 |
|---|---|---|---|
| EKP1 | Pub-Key$_1$ | Priv-Key$_1$ | Expiration Time$_1$ |
| EKP2 | Pub-Key$_2$ | Priv-Key$_2$ | Expiration Time$_2$ |
| EKP3 | Pub-Key$_3$ | Priv-Key$_3$ | Expiration Time$_3$ |
| EKP4 | Pub-Key$_4$ | Priv-Key$_4$ | Expiration Time$_4$ |
| EKP5 | Pub-Key$_5$ | Priv-Key$_5$ | Expiration Time$_5$ |
| ⋮ | | | |
| EKPN | Pub-Key$_n$ | Priv-Key$_n$ | Expiration Time$_n$ |

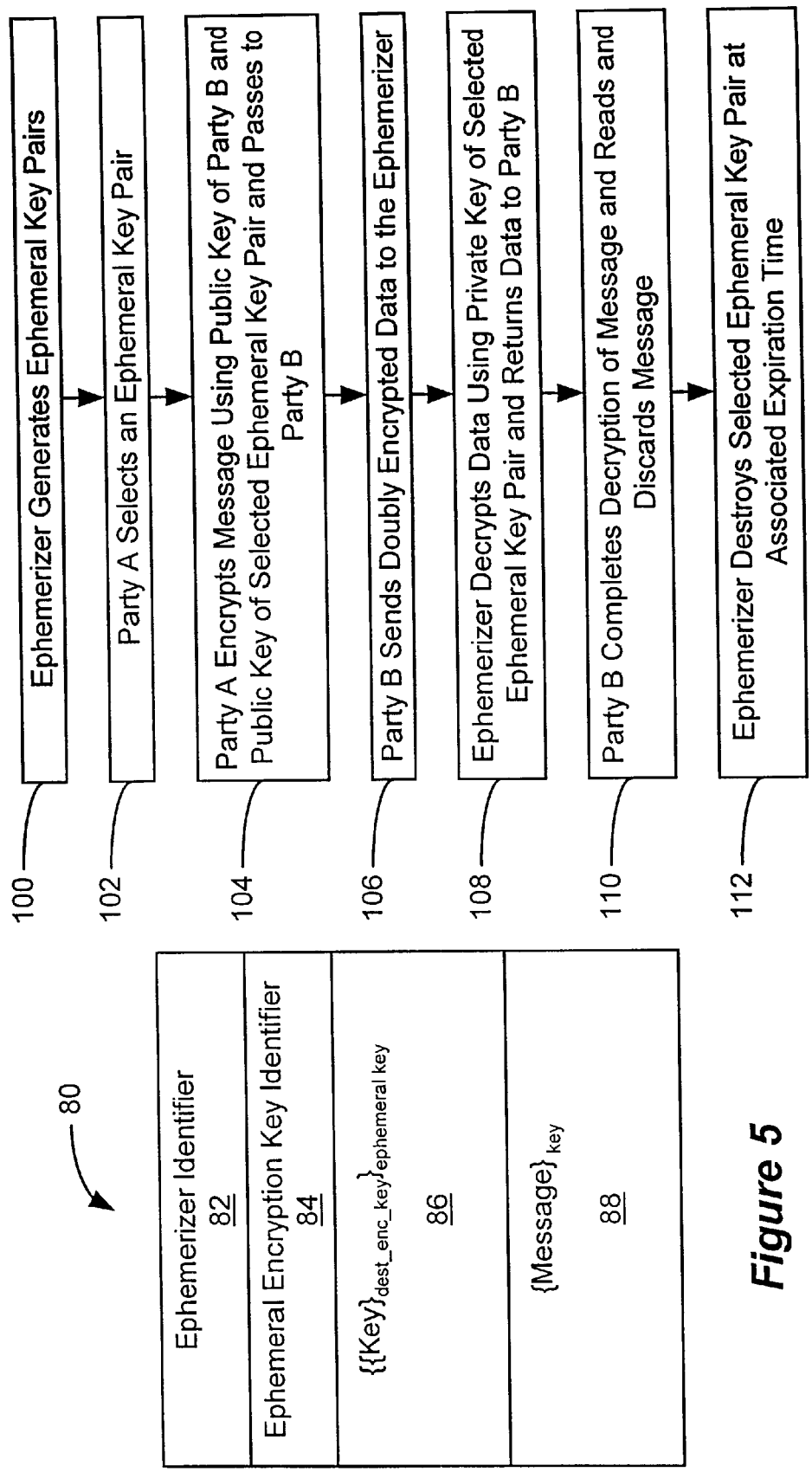

EPHEMERAL DECRYPTABILITY

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to private communications, and more specifically to a system and method for providing ephemeral decryptability of documents, files, and/or messages.

In recent years, individuals and businesses have increasingly employed computer and telecommunications networks, such as the World Wide Web (WWW), to exchange messages. These networks typically include a number of intermediate systems between the source of a message and its destination, at which the message may be temporarily written to a memory and/or data storage device. Such intermediate systems, as well as the communications lines within the network itself, are often considered to be susceptible to actions of a malicious third party, which may result in messages being intercepted as they are carried through the network. For this reason, various types of data encryption have been used for private communications through such networks. Encryption algorithms are also sometimes used to support integrity checking and authentication of received messages. Integrity checking allows the message recipient to determine whether the message has been altered since it was generated, while authentication permits the recipient to verify the source of the message.

Specific encryption algorithms are usually thought of as being either "symmetric key" or "public key" systems. In symmetric key encryption, also sometimes referred to as "secret key" encryption, the two communicating parties use a shared, secret key to both encrypt and decrypt messages they exchange. The Data Encryption Standard (DES), published in 1977 by the National Bureau of Standards, and the International Data Encryption Algorithm (IDEA), developed by Xuejia Lai and James L. Massey, are examples of well known symmetric key encryption techniques. Public key encryption systems, in contrast to symmetric key systems, provide each party with two keys: a private key that is not revealed to anyone, and a public key made available to everyone. When the public key is used to encrypt a message, the resulting encoded message can only be decoded using the corresponding private key. Public key encryption systems also support the use of "digital signatures", which are used to authenticate the sender of a message. A digital signature is an encrypted digest associated with a particular message, which can be analyzed by a holder of a public key to verify that the message was generated by someone knowing the corresponding private key.

While encryption protects the encrypted data from being understood by someone not in possession of the decryption key, the longer such encrypted information is stored, the greater potential there may be for such a key to fall into the wrong hands. For example, key escrows are often maintained which keep records of past keys. Such records may be stored for convenience in order to recover encrypted data when a key has been lost, for law enforcement purposes, to permit the police to eavesdrop on conversations regarding criminal activities, or for business management to monitor the contents of employee communications. However, as a consequence of such long term storage, the keys may be discovered over time.

In existing systems, there are various events that may result in an encrypted message remaining stored beyond its usefulness to a receiving party. First, there is no guarantee that a receiver of an encrypted message will promptly delete it after it has been read. Additionally, electronic mail and other types of messages may be automatically "backed-up" to secondary storage, either at the destination system, or even within intermediate systems through which they traverse. The time period such back-up copies are stored is sometimes indeterminate, and outside control of the message originator. Thus, it is apparent that even under ordinary circumstances, an encrypted message may remain in existence well beyond its usefulness, and that such longevity may result in the privacy of the message being compromised.

Existing systems for secure communications, such as the Secure Sockets Layer (SSL) protocol, provide for authenticated, private, real-time communications. In the SSL protocol, a server system generates a short term public/private key pair, that is certified as authentic using a long term private key belonging to the server. The client uses the short term public key to encrypt a symmetric key for use during the session. The server periodically changes its short term private key, discarding any previous versions. This renders any records of previous sessions established using the former short term public key undecryptable. Such a system is sometimes referred to as providing "perfect forward secrecy". These existing systems, however, provide no mechanism for setting or determining a finite "lifetime", in terms of decryptability, for stored encrypted data or messages independent of a real-time communications session.

Accordingly it would be desirable to have a system for specifying a finite period after which stored encrypted data, such as electronic mail messages, cannot be decrypted. After such a "decryption lifetime" period expires, the encrypted data should become effectively unrecoverable. The system should provide the ability to specify such a decryptability lifetime on a per message, data unit, or file basis, independent of any particular real-time communications session.

BRIEF SUMMARY OF THE INVENTION

A system and method for providing ephemeral decryptability is disclosed, which enables a user to encrypt data in a way that ensures that the data cannot be decrypted after a finite period. One or more ephemeral encryption keys are provided to a party wishing to encrypt a message to be passed to a destination party. The ephemeral key or keys are each associated with an expiration time. Prior to the expiration time, the party wishing to encrypt the message uses the ephemeral encryption key or keys to encrypt the message, and passes the encrypted message to the destination party. The destination party uses ephemeral decryption keys associated with the ephemeral encryption keys to decrypt the received message. The provider of the ephemeral encryption keys destroys at least the ephemeral decryption keys such that they cannot be recovered after their respective expiration times. In the case where ephemeral public/private key pairs are used, then the ephemeral encryption keys are the public keys, the ephemeral decryption keys are the private keys. In the case where ephemeral symmetric keys are used, then the ephemeral encryption key and its associated ephemeral decryption key are the same key. In the present disclosure, data that has been encrypted using any kind of ephemeral key may sometimes be referred to as "ephemeral data."

In a first illustrative embodiment, a first party establishes a number of ephemeral public/private key pairs, each of which will be destroyed at an associated time in the future (the "expiration time"), and makes them publicly available. A second party then selects one of the ephemeral public/private key pairs having an expiration time appropriate for its needs, and sends one or more messages to the first party encrypted using the public key from the selected ephemeral key pair. If the ephemeral keys are symmetric keys, the second party would request an ephemeral symmetric key from the first party, causing the first party to generate an ephemeral symmetric key and securely convey it to the second party. At the expiration time, the first party destroys all copies of the ephemeral decryption key, thus rendering any messages encrypted with the associated encryption key permanently undecipherable.

In a second illustrative embodiment, a number of third party entities offer an "ephemerizer service", and are accordingly referred to as "ephemeral key servers" or "ephemerizers". Each ephemerizer publishes a selection of ephemeral public/private key pairs, or generates ephemeral symmetric keys upon request. Each ephemeral key is associated with an expiration time. A party wishing to encrypt a message acquires one of the ephemerizer's ephemeral encryption keys with an appropriate expiration time. Alternatively, where none of the associated expiration times offered by the ephemerizer are appropriate for the message to be transmitted, the party wishing to encrypt that message may request an ephemeral key expiration time or range of expiration times, in which case the ephemerizer generates an ephemeral key having an appropriate expiration time and provides it to the requester. The requesting party first encrypts the data using an encryption key of the party which will receive the message, and then encrypts the resulting encrypted data again using the acquired ephemeral encryption key. An address of the ephemerizer, as well as an indication of the selected ephemeral encryption key, may also be included in the message. When the message is received, the receiver first locates the ephemerizer, and asks the ephemerizer to decrypt at least a portion of the message. The ephemerizer decrypts at least a portion of the message as requested and returns the result to the receiver. The receiver then completes decryption of the message as necessary. At the expiration time, the ephemerizer permanently destroys the selected ephemeral decryption key.

Ephemerizers are relied upon to be available to decrypt messages encrypted using the ephemeral encryption keys they provide, to recall the associated decryption keys until their associated expiration times, and to destroy such decryption keys by their associated expiration times. However, for various reasons, a given ephemerizer may fail to perform one or more of these tasks. Advantageously, multiple ephemerizers may be employed in the disclosed system to address the possibility of such failures. In order to address the problem of an ephemerizer failing to destroy an ephemeral decryption key by its expiration time, multiple ephemerizers may be used to perform multiple, successive encryptions of the data. With this approach, if any one of the multiple ephemerizers destroys its ephemeral decryption key, the data is no longer decryptable.

Another technique employing multiple ephemerizers addresses the problem of one or more ephemerizers becoming unavailable, or forgetting their ephemeral decryption keys prior to their associated expiration time. In this approach, a "K of N" scheme is employed by which the message is encoded using multiple ("N") ephemeral encryption keys, provided by N associated ephemerizers, such that the recipient of the encrypted message only needs a subset "K" of the associated ephemerizers to be available and having retained their decryption keys to decrypt the message. In this way, even if some subset, less than or equal to K–N of the ephemerizers from which the ephemeral encryption keys were obtained, becomes unavailable or forgets an associated decryption key, the message may still be decrypted by its recipient using the K functioning ephemerizers.

In general, ephemerizers may be selected based on a recommendation of either communicating party, or, where one party distrusts the other party to some degree, unilaterally. For example, the recipient may provide a list of ephemerizers which may be used by the encrypting party. Alternatively, the encrypting party may be permitted to select the ephemerizer or ephemerizers.

Thus there is provided a system in which data may be encrypted such that it cannot be decrypted after a finite period. The system advantageously permits selection of an appropriate decryptability lifetime for specific units of data, such as electronic mail messages. Further, where one or more third party ephemerizer systems are used to provide ephemeral keys to encrypt a message, such third party ephemerizers may be employed to destroy the ephemeral keys at their expiration times, without burdening the communicating parties with this responsibility.

As a further advantage, it is not necessary to encrypt an entire message using an ephemeral encryption key. Instead, the ephemeral key may simply be used to encrypt another key contained within the message header. In that case, the message body itself is encrypted such that it can be decrypted using the key contained in the message header. The receiver of the message need send only the message header to the appropriate ephemerizer system or systems for decryption, thus preserving communications bandwidth and improving throughput.

Another advantage of the disclosed system arises from the fact that any data sent to an ephemerizer system for decryption may be further encrypted, for example prior to encryption with any ephemeral key. In such an embodiment, the ephemerizer system or systems are not exposed to fully decrypted data ("plaintext"), and accordingly need not be completely trusted.

BRIEF DESCRIPTION OF THE SEVERAL VIEWS OF THE DRAWING

The invention will be more fully understood by reference to the following detailed description of the invention in conjunction with the drawings, of which:

FIG. 5 shows an ephemeral message format used in the second embodiment of the invention;

FIG. 6 shows steps performed to generate and process an ephemeral message in the second embodiment of the invention;

DETAILED DESCRIPTION OF THE INVENTION

Figures 1, 2:
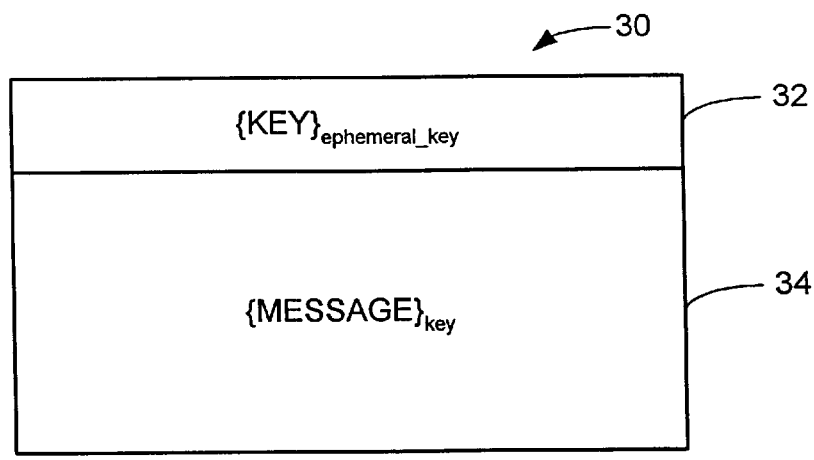
FIG. 1 shows an ephemeral key pair list.
FIG. 2 shows an ephemeral message format used in a first illustrative embodiment of the invention.

Consistent with the present invention, a system and method for providing ephemeral decryptability is disclosed which enables a user to ensure that encrypted messages will become undecryptable after a certain point in time. As shown in FIG. 1, an ephemeral key pair list includes a number of ephemeral key pairs 12. Each ephemeral key pair includes a public key part 14, a private key part 16, and an associated expiration time 18. The public key part 14 and associated expiration times 18 of the ephemeral key pairs may be read by parties wishing to use one or more of the ephemeral key pairs 12, but the private key part 16 of each ephemeral key is accessible only to the publisher of the ephemeral key list 12. As in conventional public key encryption techniques, data encrypted using one of the public keys 14 can only be decrypted using the private key 16 from the same ephemeral key pair. Each of the ephemeral key pairs 12 represents a promise by the publisher of the ephemeral key pair list 12 that the ephemeral key pair will be irretrievably destroyed at the associated expiration time.

FIG. 2 shows an illustrative ephemeral message format 30 employed in a first embodiment of the invention. The ephemeral message format 30 is shown including a message key portion 32, as well as a message body portion 34. The message key portion 32 contains a symmetric key, which itself has been encrypted by use of an ephemeral encryption key, such as either a public key from an ephemeral key pair, or an ephemeral symmetric key. The message portion 34 contains a message that has been encrypted using the symmetric key stored in the message key portion 32. Accordingly, in order to read the message in the message body portion 34, the symmetric key in the message key portion 32 must first be decrypted using the appropriate ephemeral decryption key, for example either a private key from the same ephemeral key pair as the public key used to encrypt the symmetric key in the message key portion 32, or the ephemeral symmetric key used to encrypt the symmetric key in the message key portion 32. The decrypted symmetric key in the message key portion 32 can then be used to decrypt the message body 34. Use of an ephemerally decryptable symmetric key stored within a message header is desirable because this limits the amount of data which must be decrypted using the ephemeral decryption key. This is especially significant where the ephemeral decryption key is a private key of an ephemeral key pair, because decryption using a symmetric key is significantly less computationally intense than decryption using a private key. Accordingly, the amount of the message encrypted using the ephemeral public key may be minimized.

Figure 3:
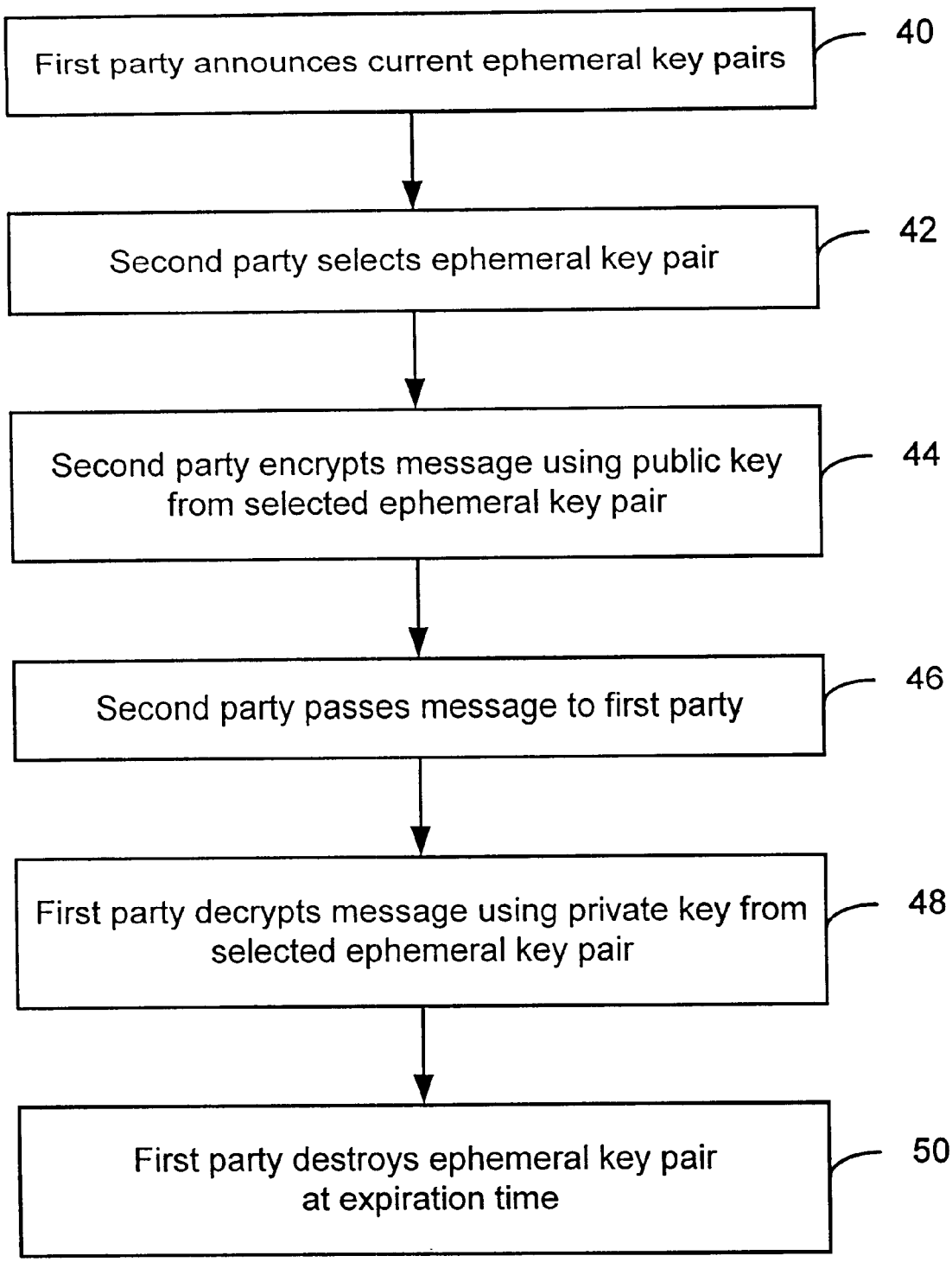
FIG. 3 shows steps performed to generate and receive an ephemeral message in the first embodiment of the invention.

As shown in the flow chart of FIG. 3, in the first embodiment of the invention, and where ephemeral public/private key pairs are employed, a first party may announce a current ephemeral key pair list at step 40. Alternatively at step 40, where ephemeral symmetric keys are employed, the first party may simply accept a request for an ephemeral symmetric key from a second party wishing to pass ephemeral data to the first party. The first party and second party described in connection with FIG. 3 may be software processes, personal computers, workstations, or any other type of devices which are capable of exchanging messages by way of a communications or messaging infrastructure such as a computer network or the internet.

At step 42, in the case where ephemeral public/private key pairs are employed, the second party selects an ephemeral key pair from the ephemeral key pair list announced by the first party at step 40. If ephemeral symmetric keys are used, then at step 42 the second party receives an ephemeral symmetric key from the first party in response to the previous ephemeral key request. An ephemeral key pair list may include ephemeral key pairs having a variety of different associated expiration times, thus allowing the second party to select an ephemeral key pair having an associated expiration time adequate to both permit a particular message to be passed to the first party and permit the first party to read and/or otherwise process the message. The second party may provide a desired expiration time or expiration time range to the first party, causing the first party to provide an ephemeral key pair or ephemeral symmetric key having a requested expiration time. When an ephemeral symmetric key is provided to the second party, it should be conveyed in a secure manner, for example through a conventional encrypted tunnel mechanism.

At step 44, the second party encrypts the message using the ephemeral encryption key, for example either a public key from a selected ephemeral key pair, or a securely provided ephemeral symmetric key. To provide efficient processing, and because symmetric key encryption may be significantly more efficient than public key encryption, the second party may first encrypt the message body using a symmetric key, then encrypt that symmetric key using the ephemeral encryption key, and include the encrypted symmetric key as part of the message, for example in the message header. The message body may alternatively or additionally be encrypted using the ephemeral encryption key. At step 46, the second party passes the message to the first party via a communications or messaging infrastructure such as a computer network or the internet.

At step 48, the first party decrypts the symmetric key in the message using an ephemeral decryption key, for example either the private key from the selected ephemeral key pair, or the ephemeral symmetric key previously provided to the second party. The first party further uses the decrypted symmetric key from the message to decrypt the message body. Where the message body was encrypted using the ephemeral encryption key, the first party uses the ephemeral decryption key to decrypt the message body. The first party then reads or otherwise processes the message without storing a decrypted copy of it which could later be discovered and read by an unauthorized party. At step 50 the first party destroys the ephemeral decryption key at the associated expiration time such that it cannot be recovered. Such a destruction capability may be provided in a hardware device which stores at least the ephemeral decryption keys and which only allows them to be read after receiving proof of a current time prior to the expiration time, or which erases the memory in which the ephemeral decryption keys are stored at their associated expiration times such that they cannot be recovered, for example by powering down a volatile memory in which the ephemeral keys are stored.

Figure 4:
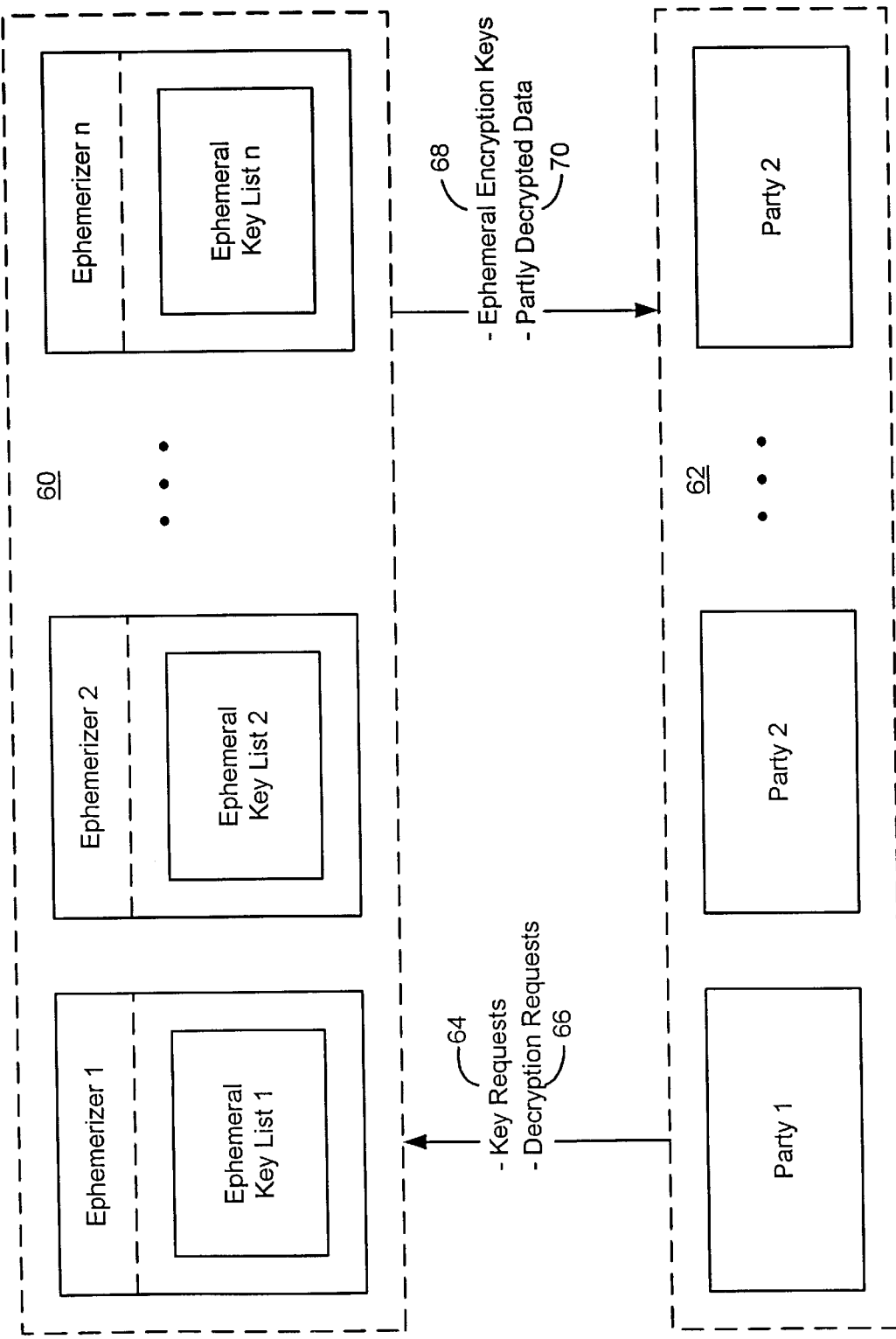
FIG. 4 shows several ephemerizers together with a number of user parties in a second illustrative embodiment of the invention.

A second embodiment of the invention, as illustrated in FIG. 4, includes one or more ephemerizers 60 shown as Ephemerizer 1 through Ephemerizer M. Each of the ephemerizers 60 may supply ephemeral encryption keys to one or more of a number of parties 62. For example, one or more of the ephemerizers 60 may include an ephemeral key pair list, including expiration times associated with each ephemeral key pair, which is accessible to one or more of the parties 62. Further, one or more of the ephemerizers 60 may provide, upon request, ephemeral symmetric keys. The parties 62, shown as party 1 through party M, are communicative with the ephemerizers 60, via a communications or messaging infrastructure such as a computer network or the internet. Each of the parties 62 and/or ephemerizers 60, may be a software process, personal computer, workstation, or any other type of device which is capable of exchanging messages by way of a communications or messaging infrastructure.

During operation of the components shown in FIG. 4, and as described in further detail with reference to FIG. 6, the parties 62 may read public keys from ephemeral key pairs made publicly accessible by the ephemerizers 60, and/or pass requests 64 for ephemeral keys having certain associated expiration times to the ephemerizers 60. The parties 62 also pass decryption requests 66 to the ephemerizers 60. The ephemerizers 60 may pass ephemeral encryption keys 68 and partly decrypted data 70 to the parties 62. The partly decrypted data 70 is "partly" decrypted in the sense that while it has been decrypted using an ephemeral decryption key by one of the ephemerizers 60, it may still require decryption using another decryption key which is unknown to that ephemerizer.

FIG. 5 shows an example of an ephemeral message format 80 applicable, for example, to the second embodiment of the invention as shown in FIG. 4. The ephemeral message format 80 includes an ephemerizer identifier 82 identifying one of the ephemerizers 60, such as a Uniform Resource Locator (URL), Internet Protocol (IP) address and port number combination, or other type of name or address information. The message format 80 further includes an ephemeral encryption key identifier 84, such as an index, remote reference, or pointer, for example indicating an ephemeral key pair within an ephemeral key pair list published by the ephemerizer identified by the ephemerizer identifier 82. Alternatively, the ephemeral encryption key identifier 84 may indicate an ephemeral symmetric key known by that ephemerizer. A message key portion 86 includes a symmetric key encrypted by both an encryption key of the destination party to which the message will be passed, as well as by the ephemeral encryption key indicated by the ephemeral encryption key identifier 84. The message body portion 88 is encrypted with the symmetric key included in the message key portion 86.

FIG. 6 illustrates steps performed during operation of the second embodiment of the invention. At step 100, in the case where ephemeral public/private key pairs are employed, an ephemerizer may make an ephemeral key pair list publicly available. However, in the case where ephemeral symmetric keys are provided by an ephemerizer, such keys would not be made publicly accessible, but would instead be provided in response to ephemeral key requests.

At step 102, Party A obtains an ephemeral encryption key, for example by selecting an ephemeral key pair from an ephemeral key pair list, or by receiving an ephemeral symmetric key provided by an ephemerizer in response to a previous ephemeral key request. The ephemeral encryption key may be selected or requested in such a way that it has an associated expiration time appropriate for a message Party A intends to pass to Party B. For example, Party A may select a publicly available ephemeral key pair having an appropriate associated expiration time. Alternatively, Party A may indicate a desired expiration time or range of times to the ephemerizer in a ephemeral key request, causing the ephemerizer to provide an ephemeral encryption key having the requested expiration time. Where the message to be passed is an electronic mail message, Party A may reasonably obtain an ephemeral encryption key associated with an expiration time that is one week in the future. Such a decryption lifetime would allow for the possibility that a recipient of the message may not check or read his or her received messages on a more frequent basis. The desired decryption period may also be calculated to take into consideration communication links and/or intermediate networking devices between Party A and Party B, which may become temporarily unusable, thus potentially delaying delivery of the message.

At step 104, Party A encrypts the message to be sent to Party B. Consistent with the message format 80 shown in FIG. 5, Party A encrypts the message body using a symmetric key, and doubly encrypts that symmetric key, first using an encryption key of Party B, and then applying the ephemeral encryption key to the result. Party A includes the doubly encrypted symmetric key in the message, as well as indications of the ephemerizer and ephemeral encryption key, and passes the complete message to Party B. Upon receipt of the message from Party A, at step 106, Party B sends the doubly encrypted symmetric key to the ephemerizer indicated within the message.

At step 108, the ephemerizer applies the appropriate ephemeral decryption key to the doubly encrypted symmetric key, for example using a private key from an ephemeral key pair also including the public key used as the ephemeral encryption key for the message. The result of this decryption is a copy of the symmetric key still encrypted by the encryption key of Party B. The ephemerizer passes this still encrypted symmetric key back to Party B, which then uses its own decryption key to complete decrypting the symmetric key at step 108. Party B uses the completely decrypted symmetric key to decrypt the body of the message. Party B assures that all reading or processing of the decrypted message is performed without storing a copy of the decrypted message that could later be read by an unauthorized party, and that all temporary copies of the decrypted message are irretrievably destroyed. The ephemerizer permanently destroys the ephemeral decryption key at the associated expiration time in step 112.

Other aspects and variations of the disclosed embodiments are now described. In both the first and second embodiment, ephemeral key pairs may be shared, in the sense that multiple encrypting parties may use the same public key from a given ephemeral key pair. Additionally, a public key of an ephemeral key pair may be used to encrypt multiple messages or files, by the same or different encrypting parties. As described above, message keys may be doubly encrypted to ensure ephemerizers cannot access fully decrypted message text. In the first embodiment (FIG. 3), ephemeral key pairs may be shared, even where messages or message keys are only singly encrypted with the public ephemeral key.

Figure 7:
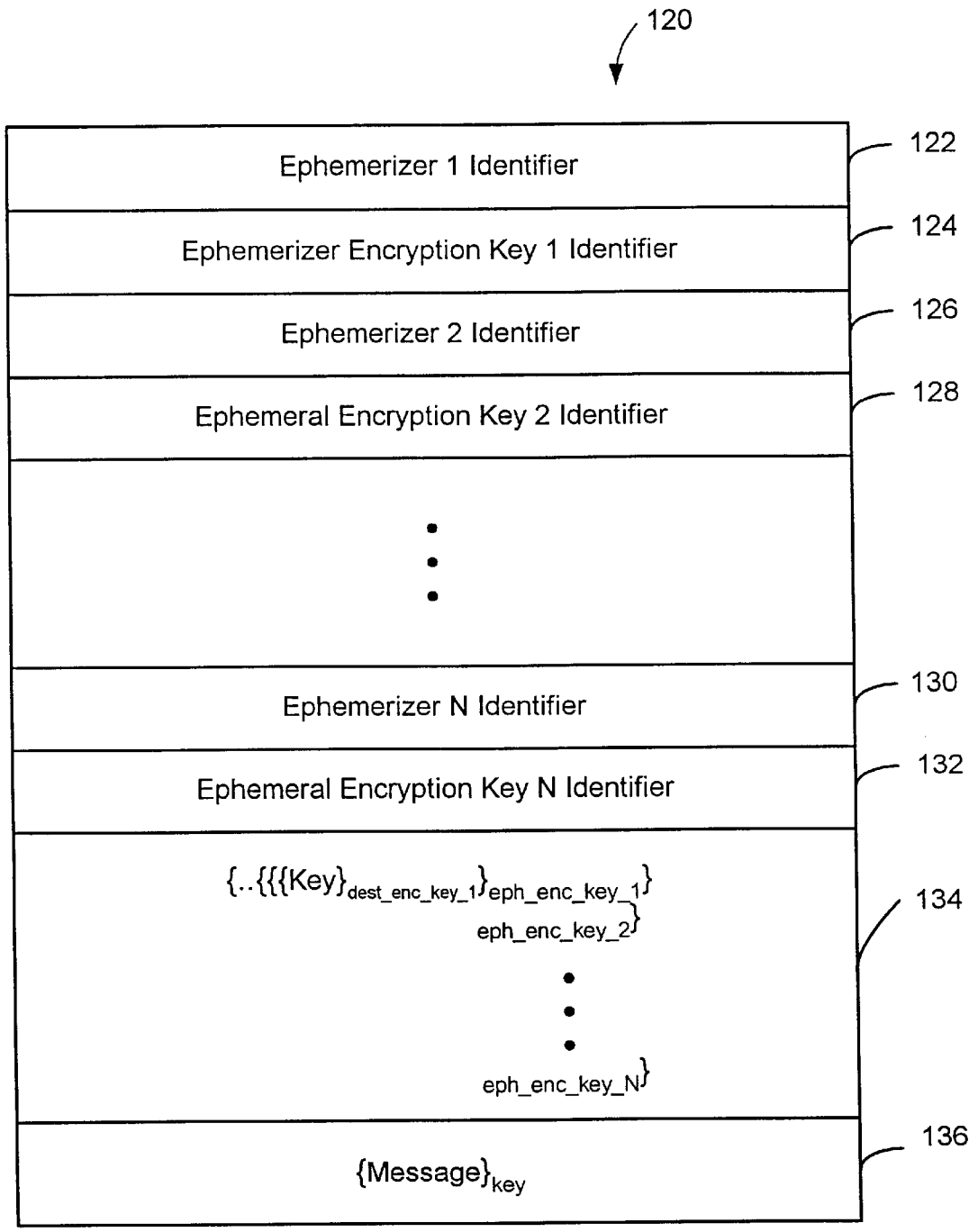
FIG. 7 shows an ephemeral message format which may be used when multiple ephemerizers are employed to perform multiple successive encryptions using ephemeral encryption keys.

As illustrated by the ephemeral message format 120 shown in FIG. 7, multiple ephemerizers may be used to successively encrypt the message symmetric key, message body, or portions thereof. The ephemeral message format 120 includes a list of identifiers for N ephemerizers, together with identifiers for N associated ephemeral encryption keys. Specifically shown are ephemerizer 1 identifier 122, ephemeral encryption key 1 identifier 124, ephemerizer 2 identifier 126, ephemeral encryption key 2 identifier 128, and so forth through ephemerizer N identifier 130 and ephemeral encryption key N identifier 132. The message key portion 134 of the ephemeral message format 120 includes a symmetric key which was used to encrypt the message body 136, and which has been successively encrypted with each of the ephemeral encryption keys 1 through N of the ephemerizers 1 through N. Accordingly, in order to decrypt the message body 136, the receiver must use each of the ephemerizers 1 through N to successively decrypt the symmetric key in the message, so that the message body 136 may be decrypted using the decrypted symmetric key. Thus when multiple ephemerizers are used to provide encryption of a message in the message format 120, if at least one of the corresponding ephemeral private keys is destroyed at the associated expiration time, the message becomes completely un-decryptable at that time.

Figure 8:
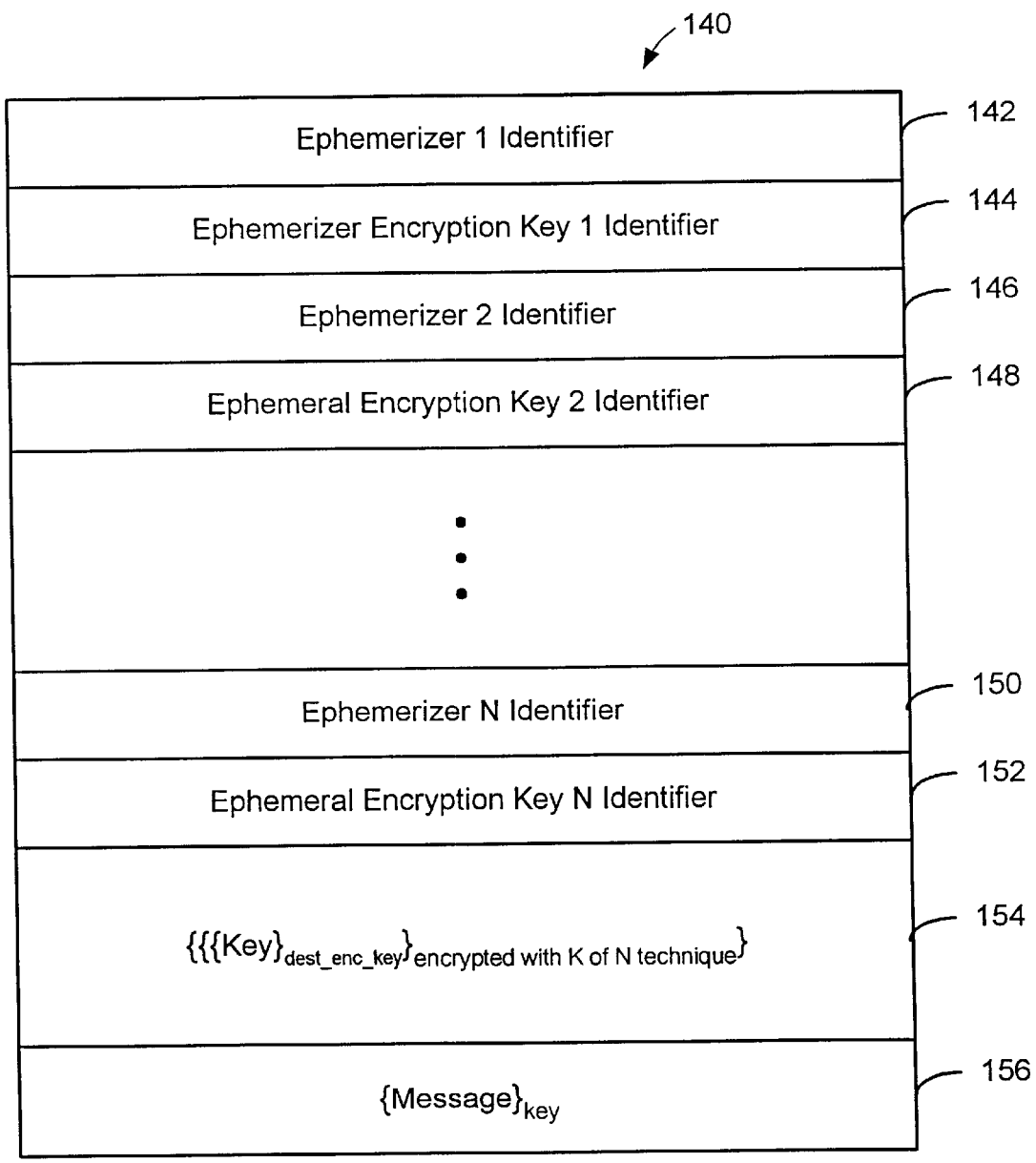
FIG. 8 shows an ephemeral message format which may be used when multiple ephemerizers are employed to perform a K of N form of encryption.

In another technique using multiple ephemerizers, and as illustrated by the ephemeral message format 140 shown in FIG. 8, a set of N ephemerizers may be used to encrypt a message key in a way that permits decryption using a subset of K ephemerizers of the N encrypting ephemerizers. Such an approach may exploit conventional "K of N" secret-sharing algorithms. The ephemeral message format 140 includes a list of identifiers for N ephemerizers, together with identifiers for N associated ephemeral encryption keys. Specifically shown are ephemerizer 1 identifier 142, ephemeral encryption key 1 identifier 144, ephemerizer 2 identifier 146, ephemeral encryption key 2 identifier 148, and so forth through ephemerizer N identifier 150 and ephemeral encryption key N identifier 152. The message key portion 134 of the ephemeral message format 140 includes a symmetric key which was used to encrypt the message body 156, and which has been encrypted with the ephemeral encryption keys 1 through N of the ephemerizers 1 through N, such that the decryption keys associated with only K of the ephemeral encryption keys 1 through N are necessary to decrypt it. Accordingly, the receiver of the message need only use K of the N ephemerizers used to encrypt the message to decrypt the message, enabling the message to be decrypted even in the case where up to N−K of the N encrypting ephemerizers either become unavailable, or forget the necessary ephemeral decryption keys prior to the appropriate expiration time.

As a further illustration of using multiple ephemerizers, an ephemeral message may be encrypted in j stages, using a series of j independent ephemerizer sets. At each stage, an ephemerizer set associated with that stage operates on the results from an ephemerizer set associated with the previous encryption stage. Each ephemerizer set may consist of a single necessary ephemerizer, multiple necessary ephemerizers, or multiple ephemerizers employing a K of N type encryption algorithm. Accordingly, the ephemerizer sets may be represented by the following expression:

$$\{(K_1, N_1), (K_2, N_2) \ldots (K_j, N_j)\}$$

If $K_i = N_i = 1$, then a single necessary ephemerizer is used at that stage, if $K_i = N_i > 1$ then multiple necessary ephemerizers are used at that stage, and if $K_{i<Ni}$ then $K_i$ of the $N_i$ ephemerizers in the set are necessary at that stage of decryption.

While the preceding alternatives are discussed with regard to encryption using a message key contained within the message to encrypt the message body, they are also applicable where the message body itself is encrypted, at least in part, using the ephemeral encryption key or keys. It is also possible to apply the disclosed system to messages which include multiple symmetric keys that are used to encrypt different portions of the message, or which are used in combination to encrypt the message multiple times. For example, a message format may be employed in which the message body is encrypted using a first symmetric key $K_1$. A version of $K_1$ that is encrypted using a public key of the message recipient is included in the message. A second symmetric key $K_2$ is then used to again encrypt $K_1$ and the message body. A version of $K_2$ that is encrypted using a first ephemeral encryption key is also included in the message. Another symmetric key $K_3$ may then be used to again encrypt $K_2$, $K_1$, and the message body. A version of $K_3$ encrypted with a second ephemeral encryption key is also included in the message. This type of ephemeral message format is extensible to employ as many symmetric keys within the message as are needed.

While in many circumstances the disclosed system may be preferably applied using ephemeral public/private key pairs, ephemeral symmetric keys may be desirable in some implementations or operational environments. Ephemeral symmetric keys may be used for single stage encryption using a single key, or as part of a multi-stage encryption using multiple keys. In multi-stage encryption, ephemeral symmetric keys may be used in combination with other types of ephemeral keys including public keys of ephemeral public/private key pairs.

With regard to ephemerizer business models, the ephemerizer service of the second embodiment may be designed to charge for use of ephemeral key pairs, or for the decryption service provided to the recipient of a message encrypted with an ephemeral public key. Such charging may, for example be based on message size or average number of messages over time.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

In an exemplary hardware platform on which a software based implementation of the present invention would execute, the program code executes on one or more processors, for example a microprocessor. The program code may be stored in, and may be executed on the processor from, a memory such as a Random Access Memory (RAM) or Read Only Memory (ROM). The memory storing the program code is communicable with the processor, for example by way of a memory bus. In addition, the exemplary platform may include various input/output (I/O) devices, such as a keyboard and mouse, as well as secondary data storage devices such as magnetic and/or optical disks. As mentioned above, a destruction capability may be provided in a hardware device which stores at least the ephemeral decryption keys and which only allows them to be read after receiving proof of a current time prior to the expiration time, or which erases the memory in which the ephemeral decryption keys are stored at their associated expiration times such that they cannot be recovered, for example by powering down a volatile memory in which the ephemeral keys are stored.

While the invention is described through the above exemplary embodiments, it will be understood by those of ordinary skill in the art that modification to and variation of the illustrated embodiments may be made without departing from the inventive concepts herein disclosed. Specifically, while the preferred embodiments are disclosed with reference to messages passed between users of a computer network, the invention may be employed in any context in which messages are passed between communicating entities. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method of supporting data encryption, comprising:
   indicating to a first party at least one expiration time, said indicating of said at least one expiration time performed by a second party;
   providing, by said first party, at least one encryption key associated with said expiration time to said second party;
   receiving data encrypted by said second party using said encryption key;
   decrypting, at least in part, said encrypted data using a decryption key associated with said encryption key; and
   destroying, by said first party, said decryption key associated with said encryption key at said expiration time.

2. The method of claim 1, wherein said encryption key is a symmetric encryption key, and wherein said decryption key associated with said encryption key is the same as said encryption key.

3. The method of claim 1, further comprising receiving an encryption key request from said second party, said encryption key request including a requested expiration time range.

4. The method of claim 3, wherein said providing said at least one encryption key by said first party is responsive to said receiving said encryption key request from said second party, and wherein said associated expiration time is within said requested expiration time range.

5. The method of claim 1, wherein said encryption key is a public key of an encryption key pair, said encryption key pair further including a private key, and wherein said decryption key is the same as said private key.

6. The method of claim 5, wherein said encryption key pair is one of a plurality of encryption key pairs, each of said plurality of encryption key pairs including a public and a private key, each of said encryption key pairs associated with a respective expiration time.

7. The method of claim 6, wherein said public keys and said expiration times of said plurality of encryption key pairs are accessible to said second party.

8. The method of claim 7, further comprising selecting, by said second party, one of said encryption key pairs, said selected one of said encryption key pairs including a public key equal to said encryption key, and said selected one of said encryption key pairs having a respective expiration time equal to said expiration time associated with said encryption key.

9. A method of supporting data encryption, comprising:
   providing, by a first party, at least one encryption key associated with an expiration time to a second party;
   receiving data encrypted by said second party using said encryption key, wherein said encrypted data includes at least a portion of an electronic mail message;
   decrypting, at least in part, said encrypted data using a decryption key associated with said encryption key; and
   destroying, by said first party, said decryption key associated with said encryption key at said expiration time.

10. The method of claim 1 wherein said encrypted data includes at least a portion of a file.

11. The method of claim 8 wherein said encrypted data includes indication of said selected one of said plurality of encryption key pairs.

12. The method of claim 1 wherein said encrypted data includes a second encryption key.

13. The method of claim 12, wherein said encrypted data further includes a message body encrypted, at least in part, using said second encryption key.

14. The method of claim 13, wherein said second encryption key is a symmetric encryption key.

15. The method of claim 8, wherein data encrypted with a public key of said selected one of said plurality of encryption key pairs includes a message body.

16. The method of claim 8, wherein said data encrypted with a public key of said selected one of said plurality of encryption key pairs is previously encrypted using a second encryption key associated with said first party.

17. The method of claim 1, wherein said encrypted data is received from said second party via a computer network.

18. The method of claim 1, further comprising transferring, by said second party, said data encrypted using said encryption key to a third party.

19. The method of claim 1, wherein at least a portion of said data encrypted by said second party using said encryption key is received by said first party from said second party.

20. The method of claim 18, wherein at least a portion of said data encrypted by said second party using said encryption key is received by said first party from said third party.

21. The method of claim 20, further comprising transferring, by said first party to said third party, a result of said decrypting, at least in part, said encrypted data using a decryption key associated with said encryption key.

22. The method of claim 21, further comprising providing, by said third party, an identity of said first party to said second party.

23. The method of claim 22, wherein said identity of said first party is included within a list of ephemeral key servers provided to said second party by said third party.

24. The method of claim 1, further comprising selecting said first party by said second party.

25. A computer program product including a computer readable medium, said computer readable medium having a data encryption computer program stored thereon, said data encryption computer program comprising:
   program code for indicating to a first party at least one expiration time, said indicating of said at least one expiration time by a second party;
   program code for providing, by said first party, at least one encryption key associated with an expiration time to said second party;
   program code for receiving data encrypted by said second party using said encryption key;
   program code for decrypting, at least in part, said encrypted data using a decryption key associated with said encryption key; and
   program code for destroying, by said first party, said decryption key associated with said encryption at said expiration time.

26. A computer data signal embodied in a carrier wave, said computer data signal including a computer program for providing data encryption, said data encryption computer program comprising:

program code for indicating to a first party at least one expiration time, said indicating of said at least one expiration time by a second party;

program code for providing, by said first party, at least one encryption key associated with an expiration time to said second party;

program code for receiving data encrypted by said second party using said encryption key;

program code for decrypting, at least in part, said encrypted data using a decryption key associated with said encryption key; and program code for destroying, by said first party, said decryption key associated with said encryption at said expiration time.

27. A method of encrypting data to be passed from a first party to a second party, comprising:

indicating at least one expiration time, said indicating of said at least one expiration time by said first party;

providing a plurality of encryption keys to said first party, each of said plurality of encryption keys associated with at least one of a plurality of encryption key servers, each of said plurality of encryption keys having an associated decryption key and an associated expiration time, wherein said associated expiration time is equal to said expiration time indicated by said first party;

successively encrypting said data, by said first party, using each one of said plurality of encryption keys;

decrypting, at least in part, said encrypted data, by at least a subset of said plurality of encryption key servers, using at least an associated subset of said decryption keys associated with said encryption keys; and destroying at least one of said plurality of encryption keys by at least an associated one of said plurality of encryption key servers.

28. A computer program product including a computer readable medium, said computer readable medium having a data encryption computer program stored thereon, said data encryption computer program comprising:

program code for indicating at least one expiration time, said indicating of said at least one expiration time by said first party;

program code for providing a plurality of encryption keys to said first party, each of said plurality of encryption keys associated with at least one of a plurality of encryption key servers, each of said plurality of encryption keys having an associated decryption key and an associated expiration time, wherein said associated expiration time is equal to said expiration time indicated by said first party;

program code for encrypting said data, by said first party, using each one of said plurality of encryption keys;

program code for decrypting, at least in part, said encrypted data, by at least a subset of said plurality of encryption key servers, using at least an associated subset of said decryption keys associated with said encryption keys; and program code for destroying at least one of said plurality of encryption keys by at least an associated one of said plurality of encryption key servers.

29. A computer data signal embodied in a carrier wave, said computer data signal including a computer program for providing data encryption, said data encryption computer program comprising:

program code for indicating at least one expiration time, said indicating of said at least one expiration time by said first party;

program code for providing a plurality of encryption keys to said first party, each of said plurality of encryption keys associated with at least one of a plurality of encryption key servers, each of said plurality of encryption keys having an associated decryption key and an associated expiration time, wherein said associated expiration time is equal to said expiration time indicated by said first party;

program code for encrypting said data, by said first party, using each one of said plurality of encryption keys;

program code for decrypting, at least in part, said encrypted data, by at least a subset of said plurality of encryption key servers, using at least an associated subset of said decryption keys associated with said encryption keys; and program code for destroying at least one of said plurality of encryption keys by at least an associated one of said plurality of encryption key servers.

30. A method of encrypting data to be passed from a first party to a second party, comprising:

indicating at least one expiration time, said indicating of said at least one expiration time by said first party;

providing a plurality of N encryption keys to said first party, each of said plurality of N encryption keys associated with a respective one of a plurality of N encryption key servers, each of said plurality of N encryption keys having an associated decryption key and an associated expiration time, wherein said associated expiration time is equal to said expiration time indicated by said first party;

encrypting said data, by said first party, using each one of said plurality of N encryption keys, said encryption performed such that at least K of said associated decryption keys are required to decrypt said data, where K is less than N;

decrypting said encrypted data using less than N, but at least K of said plurality of N encryption key servers, using at least K of said associated decryption keys; and destroying said associated decryption keys by said plurality of N encryption servers at said associated expiration time.

31. A method of encrypting data to be passed from a first party to a second party, comprising:

indicating at least one expiration time, said indicating of said at least one expiration time by said first party;

encrypting said data in a plurality of encryption stages, using a respective set of one or more encryption key servers at each one or said plurality of encryption stages, wherein each encryption key server provides an encryption key associated with a decryption key and an expiration time, wherein said associated expiration time is equal to said expiration time indicated by said first party, and wherein said data is encrypted in at least one of said plurality of encryption stages such that less than all of the associated decryption keys of the encryption key servers in the respective encryption key server set are necessary to decrypt said data at that one of said plurality of encryption stages;

decrypting, at least in part, said encrypted data, using less than all of said encryption key servers in said encryption key server set associated with said at least one of said plurality of encryption stages; and destroying said associated decryption keys by said encryption key servers at said associated expiration time.

32. A method of supporting data encryption, comprising:
  receiving an indication of an expiration time from a remote system;
  providing, to said remote system, at least one encryption key associated with an expiration time, wherein said associated expiration time is equal to said expiration time received from said remote system;
  receiving data encrypted using said encryption key;
  decrypting, at least in part, said encrypted data using a decryption key associated with said encryption key; and
  destroying said decryption key associated with said encryption at said expiration time.

33. The method of claim 32, wherein said encryption key is a symmetric encryption key, and wherein said decryption key associated with said encryption key is the same as said encryption key.

34. The method of claim 32, further comprising receiving an encryption key request, said encryption key request including a requested expiration time range.

35. The method of claim 34, wherein said providing said at least one encryption key is responsive to said receiving said encryption key request, and wherein said associated expiration time is within said requested expiration time range.

36. The method of claim 32, wherein said encryption key is a public key of an encryption key pair, said encryption key pair further including a private key, and wherein said decryption key is the same as said private key.

37. The method of claim 36, wherein said encryption key pair is one of a plurality of encryption key pairs, each of said plurality of encryption key pairs including a public and a private key, each of said encryption key pairs associated with a respective expiration time.

38. The method of claim 37, wherein said public keys and said expiration times of said plurality of encryption key pairs are publicly accessible.

39. A method of supporting data encryption, comprising:
  providing at least one encryption key associated with an expiration time;
  receiving data encrypted using said encryption key, wherein said encrypted data includes at least a portion of an electronic mail message;
  decrypting, at least in part, said encrypted data using a decryption key associated with said encryption key; and
  destroying said decryption key associated with said encryption at said expiration time.

40. A method of supporting data encryption, comprising:
  providing at least one encryption key associated with an expiration time;
  receiving data encrypted using said encryption key, wherein said encrypted data includes at least a portion of a file;
  decrypting, at least in part, said encrypted data using a decryption key associated with said encryption key; and
  destroying said decryption key associated with said encryption at said expiration time.

41. The method of claim 32 wherein said encrypted data includes a second encryption key.

42. The method of claim 41, wherein said encrypted data further includes a message body encrypted, at least in part, using said second encryption key.

43. The method of claim 42, wherein said second encryption key is a symmetric encryption key.

44. The method of claim 32, wherein said encrypted data is received via a computer network.

45. A method of supporting data encryption between a first party and a remote second party, comprising:
  indicating, by said first party to said second party, at least one expiration time;
  obtaining, from said second party, an encryption key associated with an expiration time, wherein said associated expiration time is equal to said expiration time indicated by said first party, said expiration time indicating a time at which a decryption key associated with said encryption key will be destroyed;
  encrypting data using said encryption key; and
  transmitting said encrypted data to said second party prior to said expiration time.

46. The method of claim 45, wherein said encryption key is a symmetric encryption key, and wherein said decryption key associated with said encryption key is the same as said encryption key.

47. The method of claim 45, said obtaining further comprising transmitting an encryption key request to said second party, said encryption key request including a requested expiration time range.

48. The method of claim 47, wherein said associated expiration time is within said requested expiration time range.

49. The method of claim 45, wherein said encryption key is a public key of an encryption key pair, said encryption key pair further including a private key, and wherein said decryption key is the same as said private key.

50. The method of claim 49, wherein said encryption key pair is one of a plurality of encryption key pairs, each of said plurality of encryption key pairs including a public and a private key, each of said encryption key pairs associated with a respective expiration time.

51. A method of supporting data encryption comprising:
  obtaining an encryption key associated with an expiration time, said expiration time indicating a time at which a decryption key associated with said encryption key will be destroyed, wherein said encryption key is a public key of an encryption key pair, said encryption key pair further including a private key, and wherein said decryption key is the same as said private key wherein said encryption key pair is one of a plurality of encryption key pairs, each of said plurality of encryption key pairs including a public and a private key, each of said encryption key pairs associated with a respective expiration time, and wherein said obtaining further comprises selecting one of said encryption key pairs, said selected one of said encryption key pairs including a public key equal to said encryption key, and said selected one of said encryption key pairs having a respective expiration time equal to said expiration time associated with said encryption key;
  encrypting data using said encryption key; and
  transmitting said encrypted data to a second party prior to said expiration time.

52. A method of supporting data encryption comprising:
  obtaining an encryption key associated with an expiration time, said expiration time indicating a time at which a decryption key associated with said encryption key will be destroyed;
  encrypting data using said encryption key wherein said encrypted data includes at least a portion of an electronic mail message; and
  transmitting said encrypted data to a second party prior to said expiration time.

53. A method of supporting data encryption comprising:
  obtaining an encryption key associated with an expiration time, said expiration time indicating a time at which a decryption key associated with said encryption key will be destroyed;

encrypting data using said encryption key wherein said encrypted data includes at least a portion of an electronic mail message; and transmitting said encrypted data to a second party prior to said expiration time.

54. The method of claim 51 wherein said encrypted data includes indication of said selected one of said plurality of encryption key pairs.

55. The method of claim 45 wherein said encrypted data includes a second encryption key.

56. The method of claim 55, wherein said encrypted data further includes a message body encrypted, at least in part, using said second encryption key.

57. The method of claim 56, wherein said second encryption key is a symmetric encryption key.

58. The method of claim 51, wherein data encrypted with a public key of said selected one of said plurality of encryption key pairs includes a message body.

59. The method of claim 51, wherein said data encrypted with a public key of said selected one of said plurality of encryption key pairs is previously encrypted using a second encryption key associated with said first party.

60. The method of claim 45, wherein said encrypted data is transmitted to said second party via a computer network.

61. A system for supporting data encryption, comprising:

means for indicating to a first party at least one expiration time, wherein said indicating is by a remote second party;

means for providing, by said first party, at least one encryption key associated with an expiration time to said second party, wherein said associated expiration time is equal to said indicated expiration time;

means for receiving data encrypted by said second party using said encryption key;

means for decrypting, at least in part, said encrypted data using a decryption key associated with said encryption key; and means for destroying, by said first party, said decryption key associated with said encryption at said expiration time.

62. A system for encrypting data to be passed from a first party to a remote second party, comprising:

means for indicating to said second party at least one expiration time, said indicating of said at least one expiration time by said first party, wherein said indicating is by said first party;

means for providing a plurality of encryption keys to said first party, each of said plurality of encryption keys associated with at least one of a plurality of encryption key servers, each of said plurality of encryption keys having an associated decryption key and an associated expiration time, wherein said associated expiration time is equal to said indicated expiration time;

means for successively encrypting said data, by said first party, using each one of said plurality of encryption keys;

means for decrypting, at least in part, said encrypted data, by at least a subset of said plurality of encryption key servers, using at least an associated subset of said decryption keys associated with said encryption keys; and means for destroying at least one of said plurality of encryption keys by at least an associated one of said plurality of encryption key servers.

63. A system for encrypting data to be passed from a first party to a second party, comprising:

means for indicating to said second party at least one expiration time, wherein said indicating is by said first party;

means for providing a plurality of N encryption keys to said first party, each of said plurality of N encryption keys associated with a respective one of a plurality of N encryption key servers, each of said plurality of N encryption keys having an associated decryption key and an associated expiration time, wherein said associated expiration time is equal to said expiration time indicated by said first party;

means for encrypting said data, by said first party, using each one of said plurality of N encryption keys, said encryption performed such that at least K of said associated decryption keys are required to decrypt said data, where K is less than N;

means for decrypting said encrypted data using less than N, but at least K of said plurality of N encryption key servers, using at least K of said associated decryption keys; and means for destroying said associated decryption keys by said plurality of N encryption servers at said associated expiration time.

64. A system for encrypting data to be passed from a first party to a second party, comprising:

means for indicating at least one expiration time, wherein said indicating is by said first party;

means for encrypting said data in a plurality of encryption stages, using a respective set of one or more encryption key servers at each one or said plurality of encryption stages, wherein each encryption key server provides an encryption key associated with a decryption key and an expiration time, wherein said associated expiration is equal to said expiration time indicated by said first party, and wherein said data is encrypted in at least one of said plurality of encryption stages such that less than all of the associated decryption keys of the encryption key servers in the respective encryption key server set are necessary to decrypt said data at that one of said plurality of encryption stages;

means for decrypting, at least in part, said encrypted data, using less than all of said encryption key servers in said encryption key server set associated with said at least one of said plurality of encryption stages; and means for destroying said associated decryption keys by said encryption key servers at said associated expiration time.

65. A system for supporting data encryption, comprising:

means for indicating to a second party at least one expiration time;

means for obtaining, from said second party, an encryption key associated with an expiration time, said expiration time indicating a time at which a decryption key associated with said encryption key will be destroyed;

means for encrypting data using said encryption key; and means for transmitting said encrypted data to said second party prior to said expiration time.

66. A system for supporting data encryption, comprising:

means for receiving an indication from a remote system of at least one expiration time;

means for providing at least one encryption key associated with said expiration time;

means for receiving data encrypted using said encryption key;

means for decrypting, at least in part, said encrypted data using a decryption key associated with said encryption key; and means for destroying said decryption key associated with said encryption at said expiration time.

\* \* \* \* \*

UNITED STATES PATENT AND TRADEMARK OFFICE
CERTIFICATE OF CORRECTION

PATENT NO. : 6,363,480 B1
DATED : March 26, 2002
INVENTOR(S) : Radia J. Perlman

It is certified that error appears in the above-identified patent and that said Letters Patent is hereby corrected as shown below:

Column 9,
Line 52, "$K_{i<Ni}$" should read -- $K_i < N_i$ --.

Signed and Sealed this

Twenty-first Day of September, 2004

JON W. DUDAS
*Director of the United States Patent and Trademark Office*